June 13, 1950   L. E. THIESS   2,511,679
CERAMIC SEALING COMPOSITIONS
Filed Aug. 31, 1948
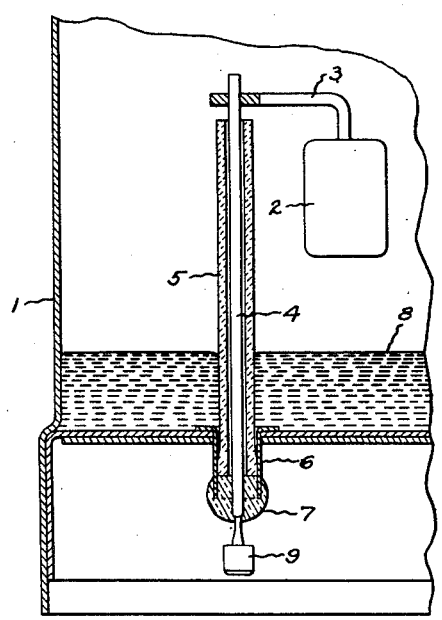
Inventor:
Ludwig E. Thiess,
by Abraham Cohen
His Attorney.

Patented June 13, 1950

2,511,679

UNITED STATES PATENT OFFICE 2,511,679

CERAMIC SEALING COMPOSITIONS

Ludwig E. Thiess, Schenectady, N. Y., assignor to General Electric Company, a corporation of New York Application August 31, 1948, Serial No. 47,067

4 Claims. (Cl. 106—54)

The present application is a continuation-in-part of my copending application Serial No. 769,671, filed August 20, 1947, now abandoned, and assigned to the same assignee as the present invention.

My invention relates to completely vitrified and vacuum-tight ceramic insulation materials adapted to be sealed to glass or metal, or both, in the fabrication of seals for hermetically sealed devices, and other purposes.

In some cases ceramically-compounded magnesium-silicate bodies have been used for this purpose. Such steatite bodies have a coefficient of thermal expansion between 7.5 and $8.0 \times 10^{-6}$ per degree centigrade. More recently, another type of magnesium-silicate, consisting primarily of forsterite-crystals ($2 \text{ MgO} \cdot \text{SiO}_2$) and having an even higher coefficient of thermal expansion of $10.6 \times 10^{-6}$ has been offered for producing a vacuum-tight ceramic-metal seal.

One of the disadvantages of the above-described magnesium-silicate ceramic compositions is their great sensitivity to sudden temperature changes as encountered in the fabrication and operation of electrical devices. Another drawback is their high expansion coefficient. Furthermore, these bodies have a tendency to soften or even blister when exposed to the conditions of high temperature and reducing atmosphere which are ordinarily employed for sintering or joining metal parts (molybdenum, iron alloys, etc.) by fusion to ceramic parts.

Zirconium-silicate ceramics have been considered for components in electronic discharge devices. Zirconium-silicate bodies are exceptionally strong, have a high resistance to thermal shock and good electrical properties. However, their thermal expansion, ranging from 3 to $4.5 \times 10^{-6}$ per degree centigrade is too low for a strain-free match with most suitable sealing glasses and metals.

My present invention comprised improved ceramic compositions comprising silicates of zirconium, magnesium and aluminum, along with a fluxing agent or frit, which compositions are completely vitreous and therefore are non-porous and vacuum-tight without any superficial glaze. Furthermore, ceramic bodies made according to my invention possess superior mechanical strength and thermal shock resistance and also show very low dielectric losses in the high-frequency ranges.

The accompanying drawing shows, as an exemplification of one form of my invention, a seal structure comprising in part ceramic compositions embodying my invention.

Lait, U. S. Patent 2,363,067, describes steatite ceramic bodies adapted for use as electrical insulators and which are also adapted to be sealed to glass, such bodies being prepared by thermal reaction between steatite and zirconium silicate ($ZrSiO_4$). The latter may be replaced partly or wholly by zirconia, $ZrO_2$. A useful modification is said to be the heat-reacted product of 90 per cent steatite and 10 per cent magnesia. Such products, however, are porous and hence are not well suited for the production of seals.

For the production of hermetic seals in evacuated devices consisting of ceramic material, it is desirable and in most cases necessary that the seal material should include completely vitrified material which can be fusion-joined on the one hand to other ceramic material or to glass and on the other hand to various metals.

I have discovered that complete vitrification of compositions comprising zirconium silicate (zircon) as a major component can be caused by the heat reaction of the zirconium silicate with both magnesium-silicate (talc) and aluminum-silicate (clay). My invention particularly includes ceramic compositions comprising a major component zirconium-silicate (zircon), in combination with magnesium-silicate, aluminum-silicate and an added flux component of a boro-silicate glass, and an oxide of an alkaline-earth such as barium oxide introduced as such or in the form of the hydroxide, carbonate or the like. When fired to approximately 1400° C., such compositions will result in completely vitrified products. The further addition of zirconia, $ZrO_2$, increases the thermal expansion so that it has been possible to produce a number of ceramic bodies having a range of thermal expansion between 5 to $6 \times 10^{-6}$. They afford a good match in hermetically and strain-free sealing of ceramic members and glass and the above-mentioned metals.

Compositions embodying my invention comprise, by weight, about 45 to 55 parts zirconium silicate, 8 to 10 parts zirconia, 22 to 30 parts magnesium silicate, 4 to 5 parts aluminum silicate, 4.5 to 5.3 parts barium oxide (6 to 7 parts barium carbonate) and 1 to 3 parts of borosilicate glass. The formed articles or products are preferably fired at 1350–1400° C. to obtain completely vitrified, vacuum-tight bodies.

The borosilicate glass is added as a fritted prefused composition such as described in my prior Patent 2,419,472.

Suitable glasses have the weight composition:

| | Percent |
|---|---|
| Boric oxide ($B_2O_3$) | 38 to 50 |
| Calcium oxide (CaO) | 20 to 30 |
| Magnesium oxide (MgO) | 6 to 2 |
| Alumina ($Al_2O_3$) | 9 to 8 |
| Silica ($SiO_2$) | 27 to 10 |

A preferred glass frit contains, by weight, 42.5% boric oxide, 29.5% calcium oxide, 6.0% magnesium oxide, 3.5% aluminum oxide and 18.5% silica. The glass frits can be made from any of the usual raw materials employed in the manufacture of glass. For example, the preferred glass may be prepared by heating a mixture of the following ingredients to a temperature of about 1110° C. at which fusion and reaction occur:

| | Parts |
|---|---|
| Boric acid | 46 |
| Calcium carbonate | 32 |
| Magnesium carbonate | 8 |
| Aluminum silicate | 5 |
| Silica | 9 |

Specific examples of ceramic compositions embodying my invention and including the preferred borosilicate glass frit comprise the following ingredients, by weight:

*Composition A*

| | Per cent |
|---|---|
| Zirconium silicate | 55 |
| Zirconia ($ZrO_2$) | 10 |
| Magnesium silicate (talc) | 22 |
| Aluminum silicate (clay) | 4 |
| Barium carbonate | 6 |
| Borosilicate frit | 3 |

*Composition B*

| | Per cent |
|---|---|
| Zirconium silicate | 45 |
| Zirconia ($ZrO_2$) | 10 |
| Magnesium silicate (talc) | 30 |
| Aluminum silicate (clay) | 5 |
| Barium carbonate | 7 |
| Borosilicate frit | 3 |

The finely divided ingredients are thoroughly mixed either by wet grinding followed by dewatering or by dry mixing the finely powdered and air-floated raw materials. An equivalent amount of barium oxide, hydroxide, sulphate, or other water-insoluble barium compound can be substituted for the barium carbonate. Ceramic products of desired form and size, for example, rings, cylinders, rods and the like are extruded from the mix or more complex shapes may be made by methods well understood by ceramists. The dried and fabricated parts are fired to 1370° C. (cone 12) or to 1400° C. (cone 14) dependent upon the composition of the body.

The electrical properties of compositions A and B are as follows: dielectric constant, K, 7.38 to 7.78, power factor (PF) 0.059% to 0.076% at 1 megacycle per second at 30 degrees centigrade. More specifically, the dielectric constant of composition B is 7.7 and its power factor is 0.065 per cent at one megacycle.

The fusion product of composition A has a coefficient of thermal expansion of $5.60 \times 10^{-6}$ and that of composition B is $5.75 \times 10^{-6}$ per degree centigrade between room temperature and 500° C. These fired ceramics may be sealed to various glasses. For example, they may be sealed to borosilicate glass such as Corning 705AJ or Corning 705BA and also to molybdenum and metal alloys, for example, the well-known commercial alloys of iron-nickel and iron-nickel-cobalt for leading-in conductors for various electronic devices and lamps One example of such an alloy is fernico comprising 54% iron, 28–30% nickel and 18–16% cobalt.

The accompanying drawing represents a portion only of a hermetically sealed apparatus, as, for example, a mercury arc rectifier. The container 1 which consists of iron, or other metal, has sealed therein an electrode 2 mounted on a conductor 3 which in turn is mounted on a leading-in conductor 4. The latter is surrounded by an insulating ceramic bushing 5 which is sealed by fusion to a dependent metal tube 6 and to an exterior glass plug 7. The plug 7, which may consist of borosilicate glass, is fusion-sealed also to the rim of the metal tube 6. The flanged opposite end of this tube 6 is welded to the container 1. The container is provided with a quantity of mercury 8. As well known during the starting cycle of mercury arc rectifiers opposite potentials are impressed upon the external contact 9 and the mercury body 8 for the operation of an arc between the auxiliary anode 2 and the mercury pool 8.

What I claim as new and desire to secure by Letters Patent of the United States is:

1. Vitreous articles consisting of a vitrified mixture of about 45 to 55 parts of zirconium silicate, 8 to 10 parts zirconia, 30 to 22 parts of magnesium silicate, 4 to 5 parts of aluminum silicate, 4.5 to 5.3 parts barium oxide and 1 to 3 parts of calcium-magnesium-aluminum borosilicate glass, said glass having the composition: boric oxide 38 to 50%, calcium oxide 20 to 30%, magnesium oxide 6 to 2%, alumina 9 to 8% and silica 27 to 10%.

2. Vitreous ceramic articles made by firing to a temperature of about 1350 to 1400° C. molded compositions consisting in admixture approximately of 45 to 55 parts of zirconium silicate, 8 to 10 parts of zirconia, 22 to 30 parts magnesium silicate, 4 to 12 parts of aluminum silicate, 1 to 3 parts of calcium-magnesium-aluminum borosilicate glass and 4 to 7 parts of barium carbonate, said glass having the composition: boric oxide 38 to 50%, calcium oxide 20 to 30%, magnesium oxide 6 to 2%, alumina 9 to 8% and silica 27 to 10%.

3. A vitreous and vacuum-tight ceramic article having a coefficient of thermal expansion of $5.75 \times 10^{-6}$ per degree centigrade, a dielectric constant of 7.70 and a power factor of 0.065 per cent at one megacycle, said ceramic article consisting of a fused mixture of 45 to 55% zirconium silicate, 8 to 10% zirconia, 22 to 30% magnesium silicate, 4 to 5% aluminum silicate, 4.5 to 5.3% barium oxide, and 1 to 3% calcium-magnesium-aluminum borosilicate glass, said glass having the composition: boric oxide 38 to 50%, calcium oxide 20 to 30%, magnesium oxide 6 to 2%, alumina 9 to 8% and silica 27 to 10%.

4. A vitreous article of claim 1 wherein said glass consists of 42.5% boric oxide, 29.5% calcium oxide, 6.0% magnesium oxide, 3.5% aluminum oxide and 18.5% silica.

LUDWIG E. THIESS.

No references cited.